(12) United States Patent
Oberdier et al.

(10) Patent No.: US 7,362,096 B2
(45) Date of Patent: Apr. 22, 2008

(54) ROBUST DETECTION OF STRAIN WITH TEMPERATURE CORRECTION

(75) Inventors: Larry M. Oberdier, Royal Oak, MI (US); Thaddeus Schroeder, Rochester Hills, MI (US); Robert J. Disser, Dayton, OH (US); Tina M. Dewar, Dayton, OH (US); Thomas A. Baudendistel, Farmersville, OH (US); Bruno Lequesne, Troy, MI (US); Donald T. Morelli, White Lake, MI (US)

(73) Assignee: Delphi Technologies, Inc., Troy, MI (US)

( * ) Notice: Subject to any disclaimer, the term of this patent is extended or adjusted under 35 U.S.C. 154(b) by 179 days.

(21) Appl. No.: 11/256,483

(22) Filed: Oct. 21, 2005

(65) Prior Publication Data

US 2007/0096724 A1 May 3, 2007

(51) Int. Cl.
*G01B 7/24* (2006.01)
*G01L 1/12* (2006.01)

(52) U.S. Cl. ........................ 324/209; 73/779
(58) Field of Classification Search ............... 324/209; 73/862.69, 862.33, 862.325, 862.381, 862.333, 73/862.331, 862.362, 763, 764, 760, 779; 702/99
See application file for complete search history.

(56) References Cited

U.S. PATENT DOCUMENTS 4,448,059 A * 5/1984 Kondo et al. ............... 73/35.09

5,307,690 A * 5/1994 Hanazawa ............. 73/862.333
2002/0162403 A1* 11/2002 Cripe ................... 73/862.333
2005/0285601 A1* 12/2005 Seto .......................... 324/526

FOREIGN PATENT DOCUMENTS

JP 2001356059 * 12/2001

* cited by examiner

*Primary Examiner*—Reena Aurora
*Assistant Examiner*—Kenneth J Whittington
(74) *Attorney, Agent, or Firm*—Scott A. McBain (57) ABSTRACT

An apparatus (10) is set forth for measuring a return signal of a magnetostrictive sensor (20) that detects a force, torque, or pressure. The return signal includes noise, a DC resistance (44), an AC resistance and an inductance and the inductance is shifted ninety degrees from the AC resistance. The apparatus (10) includes a sensor filter (22) to remove the noise from the return signal. A sensor filter (22) shifts the return signal and more specifically, the inductance by an additional angle and the sum of the additional angle and the ninety degrees phase shift is defined as the final detection angle. To detect the inductance at the final detection angle, a wave filter (16) and a reference filter (28) shifts a reference signal by the final detection angle to trigger a first demodulator (26) to detect the inductance at the final detection angle. The inductance detected by the first demodulator (26) varies due to temperature. To remove the temperature from the measured inductance, the apparatus includes a DC detection circuit (42) to detect the DC resistance which is proportional to the temperature across the sensor (20). The DC resistance and the measure inductance are inserted into a correction equation to produce a corrected inductance which is independent of temperature. Instead of inductance, an AC resistance may be used in the equation.

21 Claims, 4 Drawing Sheets

ROBUST DETECTION OF STRAIN WITH TEMPERATURE CORRECTION

This invention was made with Government support under Agreement F33615-03-3-2308 awarded by the Air Force Research Laboratory—Wright Patterson AFB, OH. The Government has certain rights in the invention.

TECHNICAL FIELD

The subject invention relates to an apparatus for measuring a return signal of a magnetostrictive sensor that detects a strain and a method for measuring an inductance or an AC resistance and a DC resistance across a coil of a magnetostrictive sensor that is subjected to a strain to produce a corrected inductance or an AC resistance which is proportional to the strain and is independent of temperature.

BACKGROUND OF THE INVENTION

Magnetostrictive sensors have proven to be effective in measuring force. By measuring the AC resistance or the inductance across a coil of the magnetostrictive sensor it is possible to determine the amount of force subjected to the sensor. Methods of measuring inductance have included the use of resonant circuits and impedance bridges. In a resonant circuit, the resonant frequency depends on inductance; a change in the latter results in changes to the frequency which can be measured with a digital counter or converted to an analog voltage using a frequency to voltage converter circuit. The linearity of this type of measurement depends on the relationship between the inductance and the frequency. In measuring inductance with an impedance bridge, the unknown inductance is placed in the AC equivalent of a Wheatstone bridge which is normally driven by a sinusoidal wave of voltage at a constant frequency. In either a two-leg or four-leg bridge, the bridge is initially balanced by adjusting elements in the bridge. Changes in the known inductance then cause an unbalance and results in a change in AC output voltage. The AC voltage must be converted to a DC voltage by one of a number of standard techniques. By measuring the change in the DC voltage the inductance may be ascertained.

The electrical output of a magnetostrictive sensor includes an in-phase component and a quadrature component and the in-phase component is shifted ninety degrees from the quadrature component. The in-phase component is the real part of the signal and is proportional to the AC resistance of the signal. The quadrature component is the imaginary part of the signal and is proportional to the inductance. A force reading may be ascertained by measuring the AC resistance or the inductance of a coil in the magnetostrictive sensor. A method for measuring the in-phase component and the quadrature component is disclosed in U.S. Pat. No. 4,654,585 (the '585 patent) to Yagi. The '585 patent discloses the utilization of a first and a second phase detector to detect the in-phase component and the quadrature component respectively. The method entails applying a first reference signal at an in-phase angle to the first phase detector to measure the in-phase component and applying a second reference signal shifted by ninety degrees from the reference signal to the second phase detector to measure the quadrature component.

Although the method as disclosed in the '585 patent is useful, there remains an opportunity for an apparatus and a method for detecting the inductance of a magnetostrictive sensor when the magnetostrictive sensor is in the presence of noise introduced by various components in an automobile. Additionally, the measured impedance is a function of temperature and thus varies as temperature changes. Generally, automotive components are exposed to temperatures between −40 C to 150 C. An opportunity exists for providing a calculated inductance or an AC resistance which is independent of temperature to provide for a robust measurement of inductance or an AC resistance which in turn leads to a more accurate reading of force.

SUMMARY OF THE INVENTION

It is the object of the present invention to provide an apparatus for measuring a return signal of a magnetostrictive sensor that detects a force. The apparatus comprises a magnetostrictive sensor for generating a return signal in response to a force and including noise and an in-phase signal and a quadrature signal shifted ninety degrees from the in-phase signal and each are a function of the force detected by the sensor. A sensor filter receives the return signal from the sensor to remove the noise and to shift the angle of the quadrature signal by an additional angle which defines a final detection angle equaling the additional angle and ninety degrees. An amplifier mechanism coupled with the sensor filter to increase the strength of the in-phase signal and the quadrature signal for creating a voltage which is proportional to said force.

A first demodulator is coupled to the amplifier mechanism to detect the quadrature signal at the final detection angle and an excitation source provides an excitation output to drive the sensor. A wave generator provides an oscillating signal having a predetermined frequency to the excitation source. A reference filter is coupled to the wave generator to produce a reference output which is shifted by the final detection angle from the oscillating signal. A reference comparator is coupled with the reference filter to produce a square wave output shifted from the oscillating signal by the final detection angle to trigger the first demodulator to detect the quadrature signal at the final detection angle.

The subject invention also provides a method for measuring a return signal of a magnetostrictive sensor that detects a force, the method includes generating a return signal from the magnetostrictive sensor in response to a force where the return signal includes noise, a DC signal, an in-phase signal and a quadrature signal shifted ninety degrees from the in-phase signal and the in-phase signal and the quadrature signal is proportional to the force detected by the sensor, receiving the return signal from the sensor with a sensor filter to remove the noise, shifting the angle of the quadrature signal with the sensor filter by an additional angle to define a final detection angle equaling the additional angle and the ninety degrees, increasing the strength of the in-phase signal and the quadrature signal with an amplifier mechanism to create a voltage which is a function of the force, detecting the quadrature signal at the final detection angle with a first demodulator coupled with the amplifier mechanism, producing an excitation output with an excitation source to drive the sensor, producing an oscillating signal having a predetermined frequency with a wave generator to drive the excitation source, producing a reference output shifted by the final detection angle from the oscillating signal with a reference filter coupled to the wave generator, producing a square wave output shifted from the oscillating signal by the final detection angle with a reference comparator, and triggering the first demodulator to detect the quadrature signal at the final detection angle with the square wave output.

It is a further object of the present invention to provide a method for measuring a quadrature signal and a DC signal across a coil of a magnetostrictive sensor which is subjected to a force to produce a corrected inductance which is proportional to the force and is independent of temperature. The method includes the steps of subjecting a magnetostrictive sensor having a coil to a force, exciting the coil with an excitation signal in response to subjecting the magnetostrictive sensor to a force, producing a return signal with the magnetostrictive sensor having a DC signal and an in-phase signal and a quadrature signal shifted ninety degrees from the in-phase signal and the DC signal is proportional to the temperature produced across the coil, detecting the quadrature signal ninety degrees from the in-phase signal with a first synchronous detector to produce a measured inductance across the coil which varies due to the temperature of the coil, detecting the DC signal with a filter to produce a DC resistance and the temperature of the coil, and inserting the DC resistance and the measured inductance into a correction equation to produce a corrected inductance which is independent of the temperature and is proportional to the amount of force subjected to the sensor.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
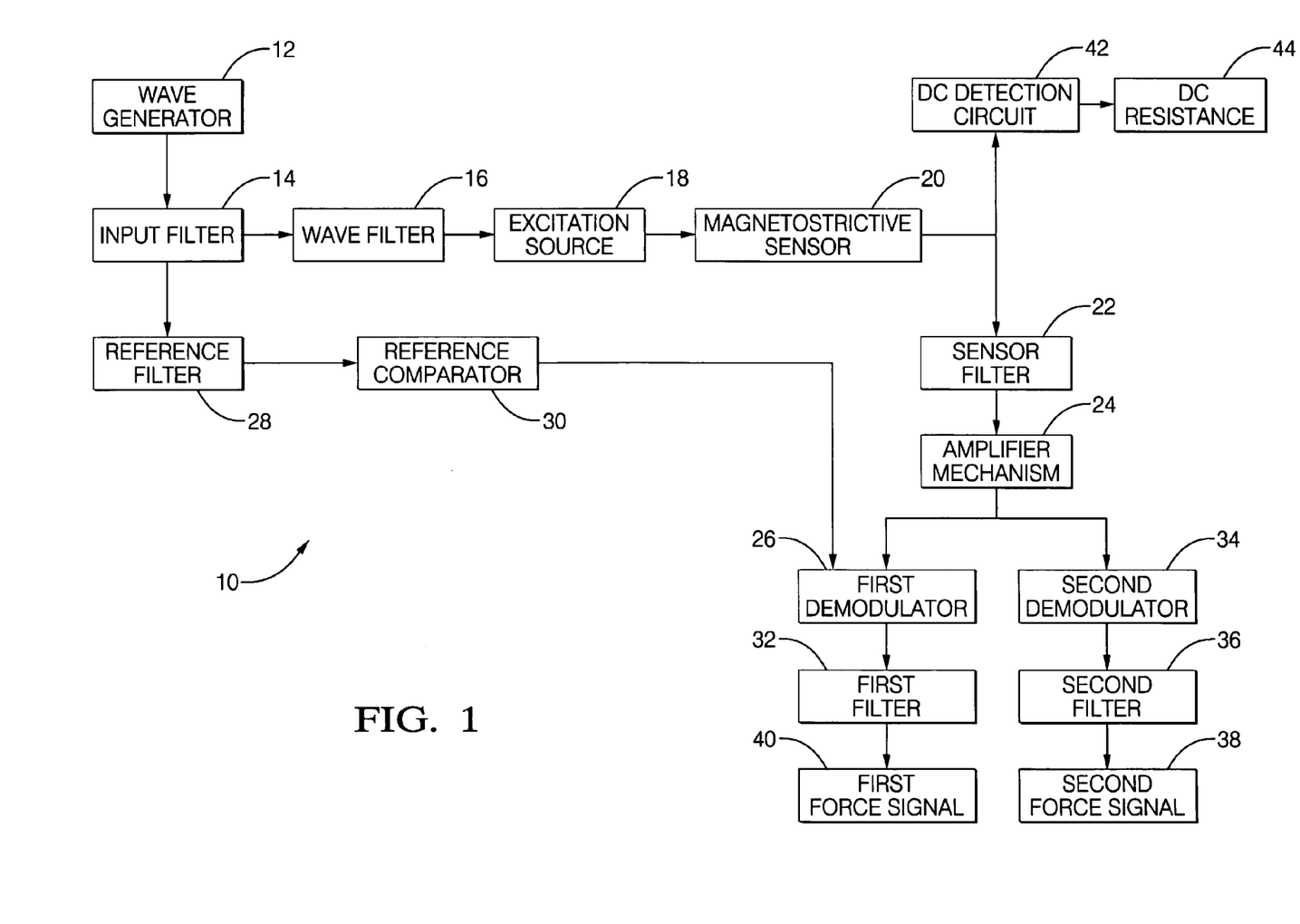
FIG. 1 is a block diagram of the apparatus.

An apparatus for measuring a return signal of a magnetostrictive sensor 20 that detects a force is shown generally at 10 in FIG. 1. The apparatus 10 includes a wave generator 12 for generating an oscillating signal in the form of a sinusoidal wave which includes harmonics at a predetermined frequency of for instance between 1 Khz-100 kHz. An input filter 14 is coupled to the wave generator 12 for removing harmonics in the oscillating signal and any frequencies above the predetermined frequency. The cutoff frequency of the input filter 14 is configured to the predetermined frequency of the sinusoidal wave.

An excitation source 18 may be a current source or a voltage source which produces an excitation output. The excitation output includes an alternating voltage or an alternating current at the predetermined frequency for driving the sensor 20 in response to the sensor being subjected to a force. The utilization of the excitation source 18 introduces noise and may include motor commutation noise between 0 Hz and 300 Hz, general noise between 0 Hz and 100 MHz, or pulse-width-modulated (PWM) noise between 20 KHz and 30 Khz. The sensor 20 generates a return signal that includes the noise introduced by the excitation source 18 in response to being subjected to a force. Additionally, the return signal includes an in-phase signal, a quadrature signal and a DC signal wherein each signal is represented in the form of a voltage output. The sensor 20 changes inductance, AC resistance and a total impedance as force is applied to the sensor 20. The in-phase signal is indicative to the AC resistance of the return signal and the quadrature signal is indicative of the inductance of the return signal. The DC signal is indicative to the DC resistance 44 as measured across the sensor 20. It is possible to determine the amount of force applied to the sensor 20 by interrogating either the in-phase signal, the quadrature signal, or by taking the magnitude of the in-phase signal and the quadrature signal to determine the total impedance which is also proportional to the force. The quadrature signal is ninety degrees out of phase or shifted from the in-phase signal and the in-phase signal is not shifted from the oscillating signal. The terms "AC resistance" and "DC resistance" are used here for convenience, and are understood as follows. Generally speaking, for any circuit such as the one involved in the proposed sensors, which are generally resistive and inductive, one can apply Thévenin's theorem, and model the coil with a single resistance and a single inductance in series. That "single resistance" is actually the sum of two components, which we call "DC" and "AC" resistances. The "DC resistance" corresponds to the standard definition of a resistance, and can be measured, for example, by applying a DC voltage and measuring the corresponding DC current. The "AC resistance" is the difference between the apparent resistances resulting from Thévenin's representation, minus the "DC resistance". In the case of the sensors described in this disclosure, the "AC resistance" is due to the eddy currents induced in the solid portions of the magnetic core.

The excitation source 18 is preferably a current source, for two reasons: First, the resulting circuit is simpler. With a current source, the real and imaginary parts of the voltage lead directly to resistance and inductance values. Voltage sources are also possible, but the circuitry may be more complicated. The other reason is that it is desirable to provide the magnetic core with a constant magnetization, that is, constant Ampere-turns. The permeability of magnetic materials depends among other things on the magnetic excitation of the core. Having a current source ensures that the excitation level will be the same, regardless of any change in impedance due to stress, temperature, or other parameters. A voltage source by contrast would provide an excitation level that would vary at least to some degree according to whatever parameter affects the impedance. In turn such a change in core excitation could change the core permeability and thus interfere with the sensor reading of strain. A sensor filter 22 is coupled to the sensor 20 and is disposed at a location in the apparatus 10 for preventing low frequencies to pass to the rest of the apparatus 10 and the cutoff frequencies of the sensor filter 22 are selected to be low enough that the magnitude of the predetermined frequency on the excitation output is not changed. The sensor filter 22 shifts the in-phase signal and the quadrature signal of the return signal by an additional angle, σ. As noted above, the phase shift of the quadrature signal prior to passing the signal through the sensor filter 22 is ninety degrees, due to the additional angle phase shift as created by the sensor filter 22, the quadrature signal is shifted to a final detection angle of σ+90.

The data in the in-phase and the quadrature signal is generally in the low frequency range of between 0 Hz and 500 Hz and is transmitted through the sensor filter 22 because the amplitude of the return signal is amplitude modulated on the excitation output transmitted at the predetermined frequency. After passing the return signal through the sensor filter 22, a substantial portion of the noise introduced onto the return signal by the excitation source 18 is removed. An amplifier mechanism 24 is coupled to the sensor filter 22 for increasing the strength of the return signal so that the remaining portion of the apparatus 10 has a larger signal to use. The amplifier mechanism 24 increases the voltage of the in-phase signal and the quadrature signal to create a voltage that is proportional to the force applied to the sensor 20.

A first demodulator 26 is coupled to the sensor filter 22 to detect the quadrature signal at the final detection angle. In order for the first demodulator 26 to detect the quadrature signal at the final detection angle, it is necessary to trigger the first demodulator 26 at the final detection angle. As noted above, the quadrature signal is shifted ninety degrees plus the additional angle from the oscillating signal after passing the quadrature signal through the sensor filter 22. To compensate, a wave filter 16 shifts the oscillating signal by a portion of the final detection angle, $\sigma_1$. The wave filter 16 is a low pass filter and is coupled to the input filter 14. The input of the wave filter 16 leads the output of the wave filter 16 by the quadrature angle, $\sigma_1$. A reference filter 28 is coupled to the input filter 14 to shift the oscillating signal by a second angle, $\sigma_2$. The reference filter 28 produces a reference output which is shifted to a total of $\sigma_1+\sigma_2$ and $\sigma_1+\sigma_2$ is equal to the final detection angle. The final detection angle may be rewritten to show $\sigma+90=\sigma_1+\sigma_2$. Those skilled in the art realize that it is possible to utilize a plurality of filters to form a predetermined angle to trigger the first demodulator 26 to detect either the in-phase signal or the quadrature signal when the signals are shifted by the predetermined angle through the utilization of at least one filter connected to the sensor 20 to remove noise from the return signal.

A reference comparator 30 is coupled with the reference filter 28 and produces a square wave output which is shifted from the oscillating signal by the final detection angle. The reference comparator 30 compares a constant voltage reference with the oscillating signal to produce the square wave output. The square wave output is received by the first demodulator 26 and triggers the first demodulator 26 to detect the quadrature signal at the final detection angle. The reference comparator 30 is configured to serve as a switch wherein the reference comparator 30 outputs the square wave output between a 25% and 75% duty cycle.

A first filter 32 is coupled to the first demodulator 26 for removing any of the remaining predetermined frequencies present on the quadrature signal after the quadrature signal has been demodulated by the first demodulator 26. The first filter 32 allows frequencies to pass with little phase shift or magnitude change at low frequencies between 0 Hz-75 Hz. The first filter 32 also removes any remaining high frequency noise that was introduced through the excitation source 18. The first filter 32 produces a first force signal 40, which is indicative of the measured inductance of the sensor 20.

A second demodulator 34 is coupled to the amplifier mechanism 24 for detecting the total impedance of the return signal. As noted above, the total impedance is the magnitude of the in-phase signal and the quadrature signal. It is not necessary to detect the in-phase angle or the quadrature angle at any particular angle. The additional angle added to the in the in-phase signal and the quadrature signal created by the sensor filter 22 has no impact on the ability of the second demodulator 34 to detect the magnitude of the in-phase signal and the quadrature signal.

A second filter 36 is coupled to the second demodulator 34 for removing any of the remaining predetermined frequencies present on the in-phase signal and the quadrature signal after the magnitude of the in-phase signal and the quadrature signal have been demodulated by the second demodulator 34. The second filter 36 allows frequencies to pass with little phase shift or magnitude change at low frequencies between 0 Hz-75 Hz. The second filter 36 also removes any remaining high frequency noise that was introduced through the excitation source 18. The second filter 36 produces a second force signal 38 which is indicative of the total impedance of the sensor 20.

A DC detection circuit 42 is coupled to the sensor 20 for detecting the DC resistance 44 across the sensor 20. The DC resistance 44 is detected in the form of a voltage and is proportional to the DC resistance 44 across the sensor 20. The DC resistance 44 is proportional to a dc offset present in the excitation signal. The DC resistance 44 measurement of the sensor 20 may be used to measure the temperature of the sensor which may be used to correct for any zero and scale drift of the sensor 20. This will be discussed in more detail below.

Figure 2:
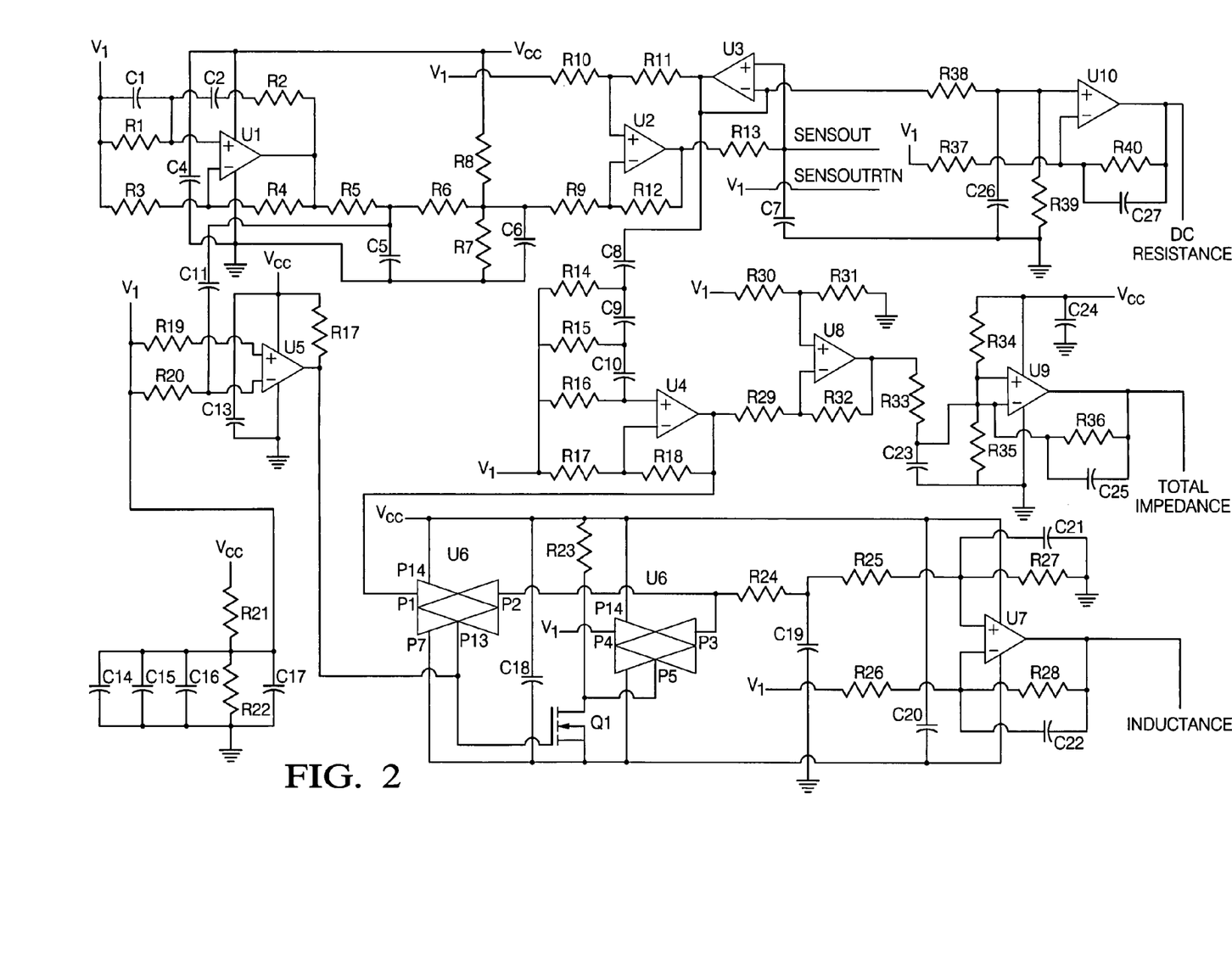
FIG. 2 is a detailed electronic schematic of the apparatus.

A more detailed schematic of the apparatus 10 is shown in FIG. 2. The wave generator 12 includes capacitors C1 and C2 in series with each other. Capacitor C2 is coupled to a first reference voltage $V_1$ which is between 0 and 6 volts. Resistor R1 is coupled to capacitor C1 and resistor R2 is coupled to capacitor C2 for establishing the predetermined frequency of the wave generator 12. Resistors R3 and R4 are coupled to an inverting input of amplifier U1 and resistors R3 and R4 set the gain for amplifier U1. The input filter 14 includes a resistor R5 and a capacitor C5 for removing harmonics in the oscillating signal and any frequencies above the predetermined frequency.

The wave filter 16 is a low pass filter and includes resistors R6, R7 and R8 which set up a reference voltage from the output of the input filter 14. Resistors R7 and R8 are coupled to resistor R6 and provide the magnitude of the output provided by the wave filter 16. Resistor R8 is coupled to a supply voltage $V_{cc}$ which is between 0 and 12 volts. The wave filter 16 also includes capacitor C6. The combination of capacitor C6 and resistors R6, R7, and R8 form the low pass filter of the wave filter 16. The excitation source 18 includes amplifiers U2 and U3. Resistor R10 is coupled to a non-inverting input of amplifier U2 and resistor R9 is coupled to an inverting input of amplifier U2. The gain output of amplifier U2 is inserted into to a SENSOUT input to drive the magnetostrictive sensor 20. Resistors R9, R10, R11 and R12 form the feedback to the output of amplifier U2. Resistor R13 is coupled to the output of amplifier U2 and to resistor R12. The amplifier U3 buffers the SENSOUT input of the magnetostrictive sensor and provides a controlled voltage across resistor R13. The return signal generated by the magnetostrictive sensor 20 is fed back to the apparatus 10 through the SENSEOUT input. Capacitor C7 provides general filtering on the return signal to the magnetostrictive sensor as it passes through the SENSEOUT input. The second lead of the magnetostrictive sensor is connected to the first reference voltage $V_1$ at through the SENSEOUTRTN input.

The sensor filter 22 is a three pole high pass filter and includes resistor R14 and capacitor C8 which form a first pole. Resistor R15 and capacitor C9 form a second pole and resistor R16 and capacitor C10 form a third pole. The amplifier mechanism 24 includes amplifier U4 for increasing the gain and buffering the output of the sensor filter 22. The amplifier mechanism 24 also includes resistors R17 and R18 to set the gain of amplifier U4. Resistor R16 and capacitor C10 are coupled to the non-inverting input of amplifier U4.

Resistor R17 is coupled the inverting input of amplifier U4 and to the first reference voltage $V_1$.

The reference filter 28 is a single pole high pass filter and includes resistor R20 and capacitor C11 which form a single pole. The reference comparator includes comparator U5. Resistor R19 is coupled to $V_1$ and a non-inverting input comparator U5. Resistor R20 is coupled to the inverting input of comparator U5 and to $V_1$. If the voltage input to the non-inverting input of comparator U5 is below the voltage input to the inverting input of comparator U5, then the output of comparator U5 is a logic low. In order to enable the output of comparator U5 to provide a logic low, the comparator U5 includes a transistor (not shown) which sets the output of comparator U5 low when the voltage input to the non-inverting input of comparator U5 is below the voltage input to the inverting input of comparator U5. If the voltage input to the non-inverting input of comparator U5 is above the voltage input to the inverting input of comparator U5, then the output of comparator U5 is a logic high. Resistor R17 allows the output of comparator U5 to provide the logic high output as resistor R17 is pulled up to $V_{cc}$. Resistors R21 and R22 are coupled with $V_{cc}$ to provide the first voltage reference $V_1$. Capacitors C14, C15, C16 and C17 are used to provide general noise filtering on the first voltage reference $V_1$.

The first demodulator 26 includes demodulator U6 coupled to the output of comparator U5 at pin P13 for detecting the quadrature signal of the return signal. As the output of comparator U5 goes high, the demodulator U6 is triggered to detect the quadrature signal at the final detection angle. The output of amplifier U4 is coupled to pin P1 of the demodulator U6 and increases the strength of the quadrature signal before the quadrature signal is passed through demodulator U6. The output is passed through pin P2 of demodulator U6. Assuming pin P13 of the demodulator U6 remains high, a transistor Q1 will not provide voltage and the output on pin P2 of the demodulator U6 will output a voltage proportional to the inductance. Pin P14 provides $V_{cc}$ to demodulator U6, and demodulator U6 is tied to ground GND via pin P7. Resistor R23 is coupled to $V_{cc}$ for providing the supply voltage to transistor Q1.

If the output of comparator U5 is low, the output of the demodulator U6 at pin P2 will not provide a voltage output and transistor Q1 will generate a voltage to enable demodulator U6 to provide a voltage output on pin P3. Since the input to the demodulator U6 is connected to $V_1$ at pin P4, the output of the demodulator at pin P3 will provide a voltage output equal to $V_1$. Capacitor C18 is coupled between $V_{cc}$ and ground GND for providing general noise filtering.

The first filter 32 filters the output of the first demodulator 26 and includes a first low pass filter which is a two pole filter. A first pole includes resistor R24 and capacitor C19 and a second pole includes resistor R27 and capacitor C21. Amplifier U7 provides additional gain on the quadrature signal detected by the first demodulator 26. Resistors R26 and R28 set up the gain for amplifier U7 and capacitor C22 provides general noise filtering on the output of amplifier U7.

The second demodulator 34 includes amplifier U8 and detects the magnitude of the in-phase signal and the quadrature signal to provide the total impedance of the return signal. The gain output of amplifier U8 is defined as ($V_1$-output of amplifier U4). A voltage output above $V_1$ generated by amplifier U4 is clipped at zero volts and a voltage output below $V_1$ is amplified by $V_1$. The amplifier U8 acts as a half wave rectifier and the output is inverted by a gain of $V_1$. Resistors R30 and R31 are connected to the non-inverting input of amplifier U8 while resistors R29 and R32 are connected to the inverting input of amplifier U8 such that the value of resistor R31 is equal to the value of resistor R32 and the value of resistor R29 is equal to the value of resistor R30. Amplifier U8 provides additional gain to the total impedance of the return signal which is set by the ratio of resistors R32 and R29.

The second filter 36 filters the output of the second demodulator 34 and includes a second low pass filter which is a two pole filter and a first pole includes resistor R33 and capacitor C23 and second pole includes resistor R36 and capacitor C25. Amplifier U9 provides additional gain on the magnitude of the in-phase signal and the quadrature signal demodulated by the second demodulator 34. Resistors R33 and R36 set up the gain of amplifier U9, and resistors R34 and R35 set up the voltage offset of amplifier U9. The supply voltage $V_{cc}$ is connected to resistor R34 which together with resistor R35 provide a reference offset voltage to the non-inverting input of amplifier U9. Capacitor C24 is coupled between $V_{cc}$ and ground GND for providing general noise filtering.

The DC detection circuit 42 detects the DC signal of the return signal which is proportional to the DC resistance 44 across the sensor 20. The DC detection circuit 42 includes a low frequency low pass filter which passes a DC signal below 5 Hz. The magnitude of the DC signal of the return signal is greater than the first reverence voltage $V_1$. Amplifier U11 provides gain, offset, and low pass filtering to the DC signal of the return signal. The gain output of amplifier U11 is defined as (DC signal of the return signal $-V_1$). Resistors R38 and R39 and capacitor C26 are connected to the non-inverting input of amplifier U11 while resistors R37 and R40 and capacitor C27 are connected to the inverting input of amplifier U11 such that the value of resistor R39 is equal to the value of resistor R40, the value of resistor R37 is equal to the value of resistor R38, and the value of capacitor C 26 is equal to the value of capacitor C27. Amplifier U11 provides additional gain to the DC signal of the return signal which is set by the ratio of resistors R40 and R37. Amplifier U11 provides offset to the DC signal of the return signal by the configuration as a differential amplifier creating a 0 to 5 volt output signal that is proportional to the DC resistance 44. The low pass filter includes resistors R39 and R40 and capacitors C26 and C27.

Figure 3:
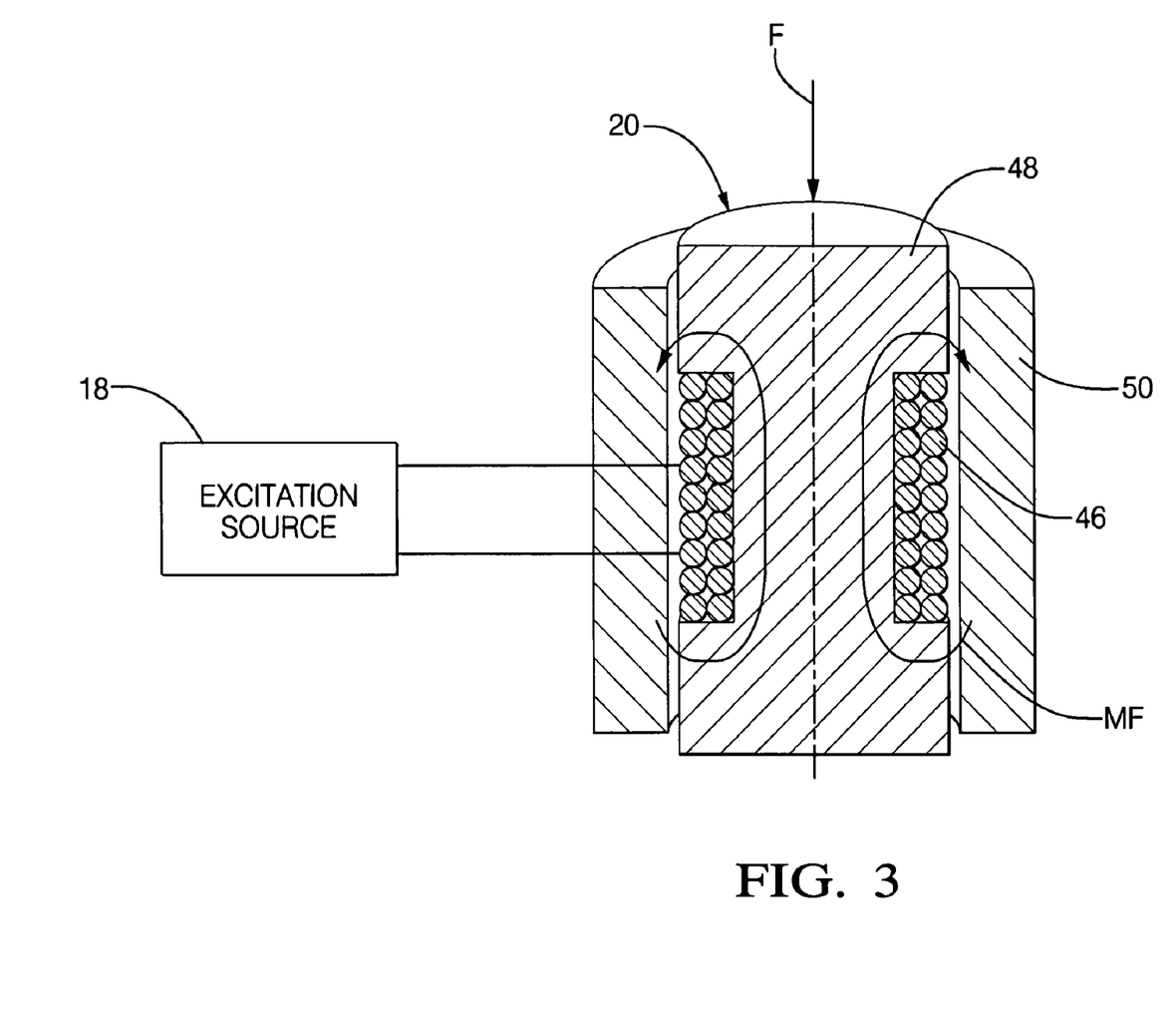
FIG. 3 is an embodiment of a magnetostrictive sensor.

Referring to FIG. 3, the magnetostrictive sensor 20 includes a core 48 made of a magnetostrictive material such as Nickel-Iron alloy which is able to conduct a magnetic flux and whose permeability or inductance is a function of the strain (F) applied to the core 48. A coil 46 is wound around the core 48. When the coil 46 is electrically excited by the excitation source 18, the coil 46 generates a magnetic flux (MF). It is possible to measure the inductance, the AC resistance, the total impedance and the DC resistance 44 across the coil 46. An element or shell 50 is preferably added to provide a low-reluctance return path for the magnetic flux MF. The shell 50 is made of any suitable ferromagnetic material.

Magnetostrictive sensors operate under the principle that the permeability of the magnetostrictive material which core 48 is made of varies with the strain core 48 is subjected to. Sensing strain itself may be useful in some circumstances. The practitioner however is usually more interested in the measure of the source of strain, such as force, torque, pressure, or any combination of these. Also, the force, torque, or pressure, may be either compressing the magnetostrictive core 48 or applying tension to it. The strain F shown in FIG. 3 will therefore be seen as representative of the force, torque, or pressure of present interest.

As noted above, the AC resistance and the inductance are functions of the amount of force applied to the magnetostrictive sensor 20. More specifically, the AC resistance and inductance are functions of the amount of strain (F) applied to the core 48. The measured DC resistance 44 across the coil 46 is indicative of the temperature of the coil 46. The inductance and AC resistance are also functions of temperature. Due to this characteristic, the inductance and AC resistance will vary depending on the temperature of the magnetostrictive sensor 20.

Figure 4:
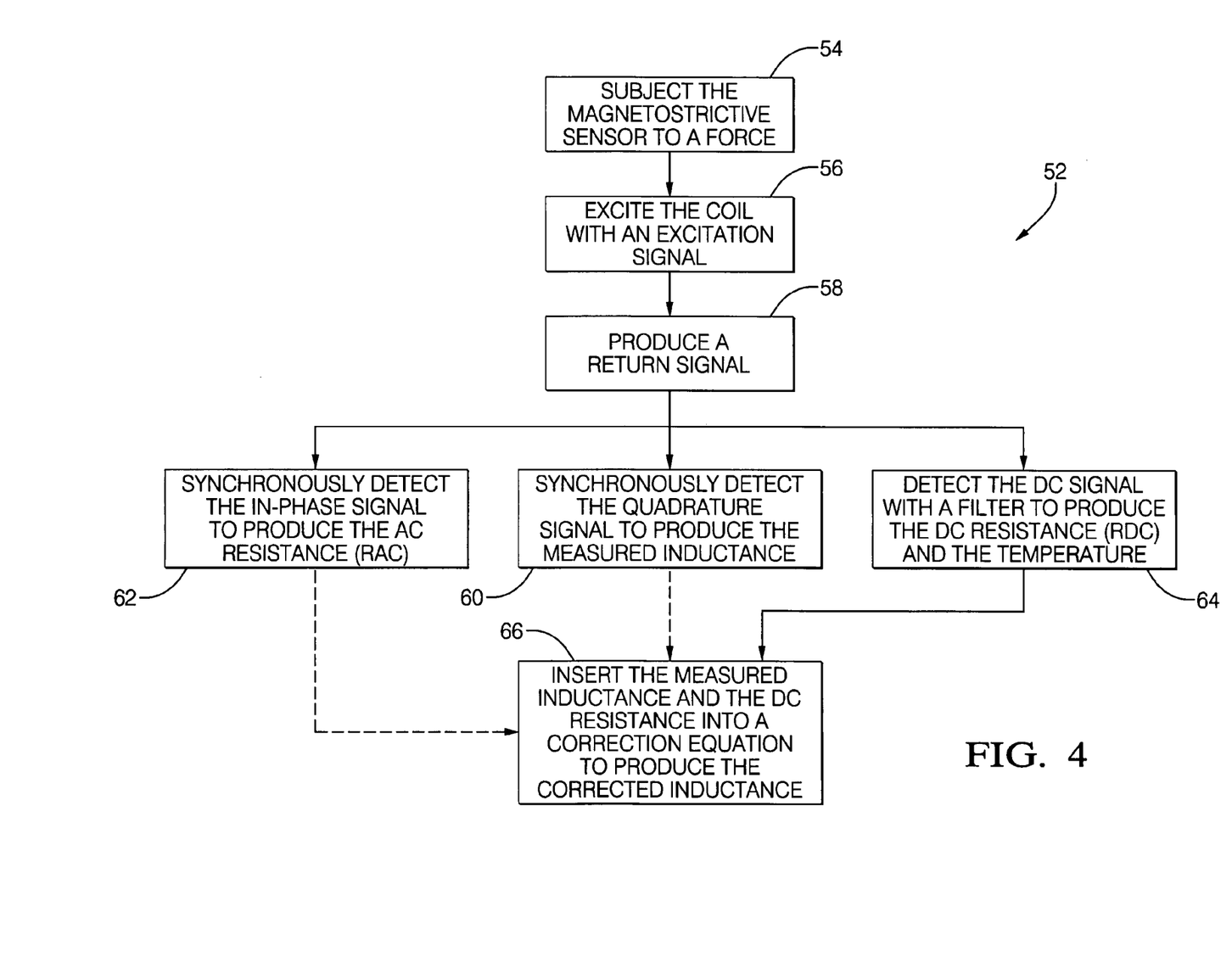
FIG. 4 is a high level flow diagram of a method for measuring the inductance and the DC resistance for providing a corrected inductance which is independent of temperature.

A method for measuring the inductance and the DC resistance 44 and for providing a corrected inductance which is independent of temperature is generally shown at 52 in FIG. 4. In step 54, the magnetostrictive sensor 20 is subjected to the strain (F). In step 56, the coil 46 of the magnetostrictive sensor 20 is excited with the excitation signal generated by the excitation source 18. In step 58, the magnetostrictive sensor 20 produces a return signal having a DC signal, the in-phase signal and the quadrature signal. In step 60, a first synchronous detector detects the quadrature signal ninety degrees from the in-phase signal to produce the measured inductance ($L_{measured}$) across the coil 46.

In step 62, a second synchronous detector detects the in-phase signal of the return signal to produce the AC resistance ($R_{ac}$). The in-phase signal and the excitation signal are in phase with each other. In step 64, the DC signal is passed through a low pass filter for detecting the DC resistance ($R_{dc}$) 44 across the coil 46. The resulting DC resistance 44 is a sensitive linear function of the temperature. By measuring the DC resistance 44 it is possible to determine the temperature of the sensor 20. In step 66, $L_{measured}$ and $R_{dc}$ are inserted into a correction equation to produce a corrected inductance, ($L_{corrected}$) which is independent of temperature. Therefore, as the temperature varies, $L_{corrected}$ will not vary due to temperature resulting in a robust measurement of the inductance which increases the accuracy of the force measurement. The correction equation is defined as:

$$L_{corrected}((\mu)) = \frac{L_{measured}(\mu, T)}{1 + A\left(\frac{R(T) - R(T_{rt})}{R(T_{rt})}\right)} \quad (a)$$

where $L_{measured}$ is the measured inductance, μ is the strain-varying permeability of the material in the core 48, R(T) is the measured DC resistance 44 of the coil 46 at the same temperature T, $R(T_{rt})$ is the DC resistance 44 at a given temperature $T_{rt}$, and A is a constant which is independent of both force and temperature. A similar method can be described for providing a corrected AC resistance which is independent of temperature. This alternative could be illustrated by modifying FIG. 4 to include a feed (dashed lines) from box 62 to a modified box 66 to also receive the AC resistance. Modified box 66 would reflect the fact that the AC resistance is the input as opposed to the inductance. This also changes $L_{measured}$ and $L_{corrected}$ in Equation (a) to $Z_{measured}$ and $Z_{corrected}$, respectively, where here "Z" is a parameter representing either an inductance, an AC resistance, or an impedance. Further, A is equal to:

$$A = \frac{1}{2} \frac{k_{NiFe}}{k_{Cu}} \frac{\rho_{Cu}(T_{rt})}{\rho_{NiFe}(T_{rt})} \quad (b)$$

where $k_{Cu}$ and $k_{NiFe}$ are the thermal coefficients of electrical resistivity for the material in the coil 46 and for the material used for magnetostrictive core 48, in Ωm/° C., and $\rho_{Cu}$ and $\rho_{NiFe}$ are the electrical resistivities at ($T_{rt}$) for, respectively, the coil material and the material used for the magnetostrictive core 48, in Ωm. Concerning the coil, copper is the usual material, although copper alloys or other materials (aluminum, etc.) could also be used. Concerning the magnetostrictive material, Nickel-Iron alloys are an attractive choice due to their mechanical strength, relatively strong magnetostriction, and lower cost. However, Equation (b) encompasses any magnetostrictive material, so the subscript "NiFe" should be understood as generic, and could represent other magnetostrictive materials such as pure Nickel, Cobalt alloys, terfenol, galfenol, and others.

Referring to FIG. 3 and as noted above, the coil 46 is excited by the excitation source 18 and a magnetic field (MF) is induced in the core 48. The magnetic field (MF) loops around the coil 46 and may travel through an airgap and a shell 50 which is made of a ferromagnetic material. The shell 50 may be any steel, or may be the same or a different Nickel-Iron alloy as the core 48. The coil 46 may be wound around the core 48. The inductance (L) of the coil 46 is inversely proportional to the reluctance $\mathfrak{R}$ of the flux path and is defined as:

$$L = \frac{N^2}{\mathfrak{R}} \quad (c)$$

where N is the number of turns in the coil 46. Neglecting leakage, the reluctance $\mathfrak{R}$ of flux path comprises three segments in series and is defined by the following:

$$\mathfrak{R} = \mathfrak{R}_{core} + \mathfrak{R}_{gap} + \mathfrak{R}_{sh} \quad (d)$$

where $\mathfrak{R}_{core}$, is the reluctance of the magnetic core 48, $\mathfrak{R}_{gap}$, is the reluctance of the airgap, and $\mathfrak{R}_{sh}$, is the reluctance of the shell 50. For simplicity, each of the reluctances $\mathfrak{R}_{core}$, $\mathfrak{R}_{gap}$ and $\mathfrak{R}_{sh}$ are assumed to have a constant cross-section S over its length l. Therefore equation (d) is rewritten to the following:

$$\mathfrak{R} = \frac{\ell_{core}}{\mu_{core} S_{core}} + \frac{\ell_{gap}}{\mu_{gap} S_{gap}} + \frac{\ell_{sh}}{\mu_{sh} S_{sh}} \quad (e)$$

Equation (c) may be re-written to incorporate equation (e) the following:

$$L = \frac{N^2}{\frac{\ell_{core}}{\mu_{core} S_{core}} + \frac{\ell_{gap}}{\mu_{gap} S_{gap}} + \frac{\ell_{sh}}{\mu_{sh} S_{sh}}} \quad (f)$$

In order to obtain the largest possible signal, $\mathfrak{R}_{gap}$ and $\mathfrak{R}_{sh}$ should be minimized so that L can change as much as possible in response to a change in core 48 permeability.

This design of the magnetostrictive sensor 20 will take this into account. Therefore, the inductance is approximately:

$$L = \frac{N^2 \mu_{core} S_{core}}{\ell_{core}} \quad (g)$$

If this simplification is not possible, that is, if the construction of the sensor is such that the magnetostrictive element does not sufficiently dominate the inductance term in equation (f), the derivations below would still apply. However, the parameters with the subscript "core" would then be understood as compounds of corresponding parameters for both the magnetostrictive part ("core") and the non-magnetostrictive part ("sh") of the magnetic circuit, the compounds being proportional to their relative weight in the inductance term.

As noted above, measuring L is performed by exciting the coil 46 with an excitation signal which may be in the form of current or voltage at a predetermined frequency between 1 KHz-10 KHz. At these frequencies, eddy current effects are strong, and the magnetic flux (MF) penetration in the core 48 is limited to the skin depth of the material of the core 48. It should be noted that if neither the core 48 nor the shell 50 is conducting, then there are no eddy currents and Equations (f) and (g) in solving for L, would not be dependent on temperature. However, in the more common instance where the core 48 is conducting and eddy currents are present, the magnetic flux decays exponentially from the surface of the core 48 and inwardly towards the inside of the material. This exponential penetration pattern is characterized by the skin depth δ, which is given by:

$$\delta = \sqrt{\frac{\rho}{\pi f \mu}} \quad (h)$$

where ρ is the material resistivity, and f is the frequency of the exciting field.

Due to the exponential penetration pattern of the magnetic flux into the core 48, the reluctance calculation should include an integral over the penetration depth, however, it can be assumed that the magnetic flux penetration is uniform, but is limited to the skin depth. Assuming the core 48 is a cylinder or radius $R_{core}$, and also assuming that the skin depth is small, the cross section of the flux path in the core 48 is:

$$S_{core} = 2\pi R_{core} \delta_{core} \quad (i)$$

The core 48 reluctance is therefore:

$$\mathfrak{R}_{core} = \frac{\sqrt{f}}{\sqrt{\rho_{core} \mu_{core}}} \frac{\ell_{core}}{2R_{core} \sqrt{\pi}} \quad (j)$$

By combining equations (g) and (h) the following is produced:

$$L = \frac{N^2 \sqrt{\mu_{core}} \sqrt{\rho_{core}}}{\sqrt{f}} \frac{2R_{core} \sqrt{\pi}}{\ell_{core}} \quad (k)$$

Denoting α, for simplification:

$$\alpha = N^2 \frac{2R_{core} \sqrt{\pi}}{\ell_{core}} \quad (l)$$

which further yields:

$$L = \alpha \frac{\sqrt{\rho_{core}} \sqrt{\mu_{core}}}{\sqrt{f}} \quad (m)$$

The significance of equation (m) is that the inductance is a function or permeability, therefore force (F), as desired; but also, a function or resistivity, more specifically, the square root of resistivity. Because resistivity is a function of temperature, the inductance is also a function of temperature.

As noted above, the sensor 20 measures the inductance L(μ, T), function of μ (therefore force), and temperature T. It is desired to determine the corrected inductance, $L_{corrected}$ and this can be achieved by relating the measured value L(μ,T) to the inductance value L(μ, $T_{rt}$) under the same μ and force, but at some given temperature $T_{rt}$ (room temperature, for instance). Based on equation (m), L(μ,T) and L(μ, $T_{rt}$) are, respectively:

$$L(\mu, T) = \alpha \frac{\sqrt{\rho_{core}(T)} \sqrt{\mu_{core}}}{\sqrt{f}} \quad (n)$$

$$L(\mu, T_{rt}) = \alpha \frac{\sqrt{\rho_{core}(T_{rt})} \sqrt{\mu_{core}}}{\sqrt{f}} \quad (o)$$

The following inductance ratio can be defined as:

$$\Delta L / L(\mu, rt) = \frac{L(\mu, T) - L(\mu, T_{rt})}{L(\mu, T_{rt})} \quad (p)$$

and based on equations (n) and (o), is:

$$\Delta L / L(\mu, rt) = \frac{L(\mu, T) - L(\mu, T_{rt})}{L(\mu, T_{rt})} = \frac{\sqrt{\rho_{core}(T)} - \sqrt{\rho_{core}(T_{rt})}}{\sqrt{\rho_{core}(T_{rt})}} \quad (q)$$

The resistivity of the core 48 is shown as a linear function as temperature as follows:

$$\rho_{core}(T) = \rho_{core}(T_{rt}) + k_{core}(T - T_{rt}) \quad (r)$$

Therefore:

-continued $$\Delta L/L(\mu, T_{rt}) = \sqrt{1 + \frac{k_{core}}{\rho_{core}(T_{rt})}(T - T_{rt})} - 1 \quad (s)$$

If the term:

$$\frac{k_{core}}{\rho_{core}(T_{rt})}(T - T_{rt})$$

is "small", then equation (s) can be approximated by:

$$\Delta L/L(\mu, T_{rt}) \approx \frac{1}{2} \frac{k_{core}}{\rho_{core}(T_{rt})}(T - T_{rt}) \quad (t)$$

More importantly, this approximation is reasonably valid even if $$\frac{k_{core}}{\rho_{core}(T_{rt})}(T - T_{rt})$$

is as large as 0.60 or 0.70. Further, given the usual range of values for materials such as Nickel-Iron alloys, this approximation would be valid over the usual temperature range encountered in automotive or similar applications. For example, a 50% NI-50% Fe alloy, $k_{core}$=0.18 $\mu\Omega$cm. Therefore, $$\frac{k_{core}}{\rho_{core}(T_{rt})}(T - T_{rt}) = 0.0042(T - T_{rt}).$$

In many automotive applications, temperature ranges from −40° to 150° C. If $T_{rt}$ is chosen to be 20° C., this would constitute a variation of at most +130° C./−60° C., therefore $$\frac{k_{core}}{\rho_{core}(T_{rt})}(T - T_{rt})$$

would be at most be equal to 0.54. If the temperature T of the magnetostrictive sensor 20 is measured, then a corrected inductance can be derived from equation (t):

$$L_{corrected} = L(\mu, T_{rt}) = \frac{L(\mu, T)}{1 + \frac{1}{2} \frac{k_{core}}{\rho_{core}(T_{rt})}(T - T_{rt})} \quad (u)$$

Measuring the DC resistance 44 of the coil 46 is a preferred method of measuring the temperature across the coil 46. The DC resistance 44 of the coil 46 at temperature T is:

$$R(T) = (\rho_{Cu}(T_{rt}) + k_{Cu}(T - T_{rt}))\frac{l}{s} \quad (v)$$

where l and s are the coil length and wire cross-section, respectively and $\rho_{Cu}$ and $k_{Cu}$, are respectively, the electrical resistivity at temperature $T_{rt}$ in $\Omega$m, and the thermal coefficient of electrical resistivity, in $\Omega$m/° C., for copper. A ratio can then be defined:

$$\Delta R/R(T_{rt}) = \frac{R(T) - R(T_{rt})}{R(T_{rt})} = \frac{\rho_{Cu}(T) - \rho_{Cu}(T_{rt})}{\rho_{Cu}(T_{rt})} \quad (w)$$

Combining equations (v) and (w) yields:

$$\Delta R/R(T_{rt}) = \frac{k_{Cu}}{\rho_{Cu}(T_{rt})}(T - T_{rt}) \quad (x)$$

Dividing equation (t) by equation (x) yields a ratio A defined as:

$$A = \frac{\Delta L/L(\mu, T_{rt})}{\Delta R/R(T_{rt})} = \frac{1}{2}\frac{k_{core}}{k_{Cu}}\frac{\rho_{Cu}(T_{rt})}{\rho_{core}(T_{rt})} \quad (y)$$

The ratio A is a function of physical constants for the material in the core 48 and the copper in the coil 46 and of the measured values of inductance and DC resistance 44. Accordingly it is possible to derive equation (a) from equation (y):

$$L_{corrected}(\mu) = \frac{L_{measured}(\mu \cdot T)}{1 + A\left(\frac{R(T) - R(T_{rt})}{R(T_{rt})}\right)} \quad (a)$$

Equation (a) provides the corrected value of inductance that is independent of temperature.

Obviously, many modifications and variations of the present invention are possible in light of the above teachings. The invention may be practiced otherwise than as specifically described within the scope of the appended claims.

| ELEMENT LIST | |
|---|---|
| Element Symbol | Element Name |
| 12 | wave generator |
| 14 | input filter |
| 16 | wave filter |
| 18 | excitation source |
| 20 | magnetostrictive sensor |
| 22 | sensor filter |
| 24 | amplifier mechanism |
| 26 | first demodulator |
| 28 | reference filter |
| 30 | reference comparator |
| 32 | first filter |

-continued

ELEMENT LIST

| Element Symbol | Element Name |
| --- | --- |
| 34 | second demodulator |
| 36 | second filter |
| 38 | second force signal |
| 40 | first force signal |
| 42 | DC detection circuit |
| 44 | DC resistance |
| 46 | coil |
| 48 | core |
| 50 | shell |

What is claimed is:

1. An apparatus for measuring a return signal of a magnetostrictive sensor that detects a strain; said apparatus comprising:

a magnetostrictive sensor (20) for generating a return signal in response to a strain and including noise and a DC signal and one of an in-phase signal and a quadrature signal shifted ninety degrees from said in-phase signal, each proportional to the strain detected by said sensor (20);

a sensor filter (22) for receiving said return signal from said sensor (20) for removing said noise and to shift the angle of said quadrature signal by an additional angle to define a final detection angle equaling said additional angle and said ninety degrees;

an amplifier mechanism (24) coupled with said sensor filter (22) to increase the strength of one of said in-phase signal and said quadrature signal for creating an output which is proportional to said strain.

a first demodulator (26) coupled to said amplifier mechanism (24) to detect one of said quadrature signal at said final detection angle and said in-phase signal;

an excitation source (18) for providing an excitation output to drive said sensor (20);

a wave generator (12) for providing an oscillating signal at a predetermined frequency to said excitation source (18);

a reference filter (28) coupled to said wave generator (12) to produce a reference output shifted by said final detection angle from said oscillating signal;

a reference comparator (30) coupled with said reference filter (28) to produce a square wave output shifted from said oscillating signal by said final detection angle for triggering said first demodulator (26) to detect said quadrature signal at said final detection angle and said in-phase signal; and a processor for producing a corrected output by correlating said DC signal and one of said quadrature and in-phase signals.

2. An apparatus as set forth in claim 1 wherein said excitation source (18) includes one of a current source or a voltage source to provide the excitation output to drive said sensor (20).

3. An apparatus as set forth in claim 1 including a wave filter (16) coupled to said excitation source (18) to shift said oscillating signal by a portion of said final detection angle.

4. An apparatus as set forth in claim 3 including a first filter (32) coupled to said first demodulator (26) for removing a portion of said predetermined frequency from said quadrature signal to provide a first strain signal (40).

5. An apparatus as set forth in claim 1 including a second demodulator (34) coupled to said amplifier mechanism (24) for detecting a total impedance of said return signal at any angle and said total impedance is the magnitude of said in-phase signal and said quadrature signal and is proportional to the strain detected by said sensor (20).

6. An apparatus as set forth in claim 5 including a second filter (36) coupled to said second demodulator (34) for removing a portion of said predetermined frequency from said quadrature signal and said in-phase signal to provide a second strain signal (38).

7. An apparatus as set forth in claim 1 including a DC detection circuit (42) coupled to said sensor (20) for detecting said DC signal which is indicative of the DC resistance (44) across said sensor (20).

8. An apparatus as set forth in claim 1 including an input filter (14) coupled with said wave generator (12) to remove any frequencies above said predetermined frequency in said oscillating signal.

9. A method for measuring a return signal of a magnetostrictive sensor that detects a strain, said method comprising:

generating a return signal from a magnetostrictive sensor (20) in response to a strain and the return signal including noise and a DC signal and one of an in-phase signal and a quadrature signal shifted ninety degrees from the in-phase signal and proportional to the strain detected by the sensor (20);

receiving the return signal from the sensor (20) with a sensor filter (22) to remove the noise;

shifting the angle of the quadrature signal with the sensor filter (22) by an additional angle to define final detection angle equaling the additional angle and said ninety degrees;

increasing the strength of said one of the in-phase signal and the quadrature signal with an amplifier mechanism (24) to create a voltage which is proportional to the strain;

detecting the quadrature signal at the final detection angle with a first demodulator (26) coupled with the amplifier mechanism (24);

producing an excitation output with an excitation source (18) to drive the sensor (20);

producing an oscillating signal at a predetermined frequency with a wave generator (12) to drive the excitation source (18);

producing a reference output shifted by the final detection angle from the oscillating signal with a reference filter (28) coupled to the wave generator (12);

producing a square wave output shifted from the oscillating signal by the final detection angle with a reference comparator (30); and triggering the first demodulator (26) to detect the quadrature signal at the final detection angle with the square wave output.

10. A method as set forth in claim 9 including removing frequencies above the predetermined frequency in the oscillating signal with an input filter (14).

11. A method as set forth in claim 9 wherein the step of producing an excitation output with an excitation source (18) to drive the sensor (20) is further defined as driving the sensor.(20) with one of a current source or a voltage source.

12. A method as set forth in claim 9 including shifting the oscillating signal by a portion of the final detection angle with a wave filter (16).

13. A method as set forth in claim 12 including removing a portion of the predetermined frequency from the quadrature signal with a first filter (32) to provide a first strain signal (40).

14. A method as set forth in claim 9 including detecting a total impedance of the return signal at any angle with a second demodulator (34) and the total impedance is the magnitude of the in-phase signal and the quadrature signal and is proportional to the strain detected by the sensor (20).

15. A method as set forth in claim 14 including removing a portion of the predetermined frequency from the total impedance of the return signal with a second filter (36) to provide a second strain signal (38).

16. A method as set forth in claim 9 including detecting the DC signal with a DC detection circuit (42) coupled to the sensor (20) to produce a DC resistance (44) across the sensor (20).

17. A method for measuring a DC signal and one of a quadrature signal and an in-phase signal across a coil of a magnetostrictive sensor that is subjected to a strain to produce one of a corrected inductance and AC resistance which is proportional to the strain and is independent of temperature; said method comprising the steps of:

subjecting a magnetostrictive sensor (20) having a magnetostrictive core and a coil (46) to a strain;

exciting the coil (46) with an excitation signal in response to subjecting the magnetostrictive sensor (20) to a strain;

producing a return signal with the magnetostrictive sensor (20) having a DC signal and one of an in-phase signal and a quadrature signal shifted ninety degrees from the in-phase signal wherein the DC signal is proportional to the temperature produced in said magnetostrictive sensor (20);

detecting one of the quadrature signal ninety degrees from the in-phase signal with a first synchronous detector to produce a measured inductance across the coil (46) which varies due to temperature and the in-phase signal with a second synchronous detector to produce a measured AC resistance across the coil (46) which varies due to temperature;

detecting the DC signal to produce a DC resistance (44) and the temperature of the sensor (20); and inserting the DC resistance (44) and one of the measured inductance and the AC resistance into a correction equation to produce one of a corrected inductance and a corrected AC resistance which is independent of the temperature and is proportional to the amount of strain subjected to the sensor (20), wherein the correction equation is further defined as:

$$Z_{corrected}(\mu) = \frac{Z_{measured}(\mu, T)}{1 + A\left(\frac{R(T) - R(T_{rt})}{R(T_{rt})}\right)}$$

wherein $Z_{corrected}$ is one of the corrected inductance, the corrected AC resistance, and the corrected impedance, $Z_{measured}$ is one of the measured inductance, the measured AC resistance, and the measured impedance, $\mu$ is the permeability of the material in the magnetostrictive core (48), R(T) is the measured DC resistance (44) of the coil (46) at the same temperature T, $R(T_{rt})$ is the DC resistance (44) at a given temperature $T_{rt}$, and A is a constant which is independent of both strain and temperature and which is equal to:

$$A = \frac{1}{2} \frac{k_{NiFe}}{k_{Cu}} \frac{\rho_{Cu}(T_{rt})}{\rho_{NiFe}(T_{rt})}$$

where $k_{NiFe}$ and $k_{Cu}$ are the thermal coefficients of electrical resistivity for the coil material (46) and the material used for the magnetostrictive core (48), in $\Omega m/^\circ$ C., and $\rho_{Cu}$ and $\rho_{NiFe}$ are the electrical resistivities at $(T_{rt})$ for, respectively, the coil material and the material used for the magnetostrictive core (48), in $\Omega m$.

18. A method as set forth in claim 17 wherein the step of detecting the DC signal with a filter is further defined as detecting the DC signal with a low pass filter to produce the DC resistance (44) and the temperature of the coil (46).

19. A method as set forth in claim 18 wherein the step of exciting the coil (46) an excitation signal is further defined as applying the excitation output to the sensor (20) with one of a current source or a voltage source.

20. A method as set forth in claim 19 wherein the step of producing a return signal with the sensor (20) is further defined as generating a return signal with the coil (46) in response to exciting the coil (46) with an excitation signal.

21. A method as set forth in claim 20 wherein the step of exciting the coil (46) with an excitation signal further includes inducing a magnetic field into a magnetostrictive core (48).

* * * * *